US008918446B2

(12) United States Patent
Boswell et al.

(10) Patent No.: US 8,918,446 B2
(45) Date of Patent: Dec. 23, 2014

(54) REDUCING POWER CONSUMPTION IN MULTI-PRECISION FLOATING POINT MULTIPLIERS

(75) Inventors: Brent R. Boswell, Aloha, OR (US); Thierry Pons, Hadera (IL); Tom Aviram, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 12/967,607

(22) Filed: Dec. 14, 2010

(65) Prior Publication Data

US 2012/0151191 A1    Jun. 14, 2012

(51) Int. Cl.
*G06F 1/00* (2006.01)
*G06F 7/44* (2006.01)
*G06F 7/52* (2006.01)
*G06F 1/32* (2006.01)

(52) U.S. Cl.
CPC .............. *G06F 1/3287* (2013.01); *G06F 7/52* (2013.01); *G06F 1/3203* (2013.01)
USPC ........... 708/620; 708/625; 708/629; 708/503; 713/324

(58) Field of Classification Search
USPC ................. 708/495, 501, 503, 513, 518, 523, 708/620–632; 713/320–324
See application file for complete search history.

(56) References Cited

U.S. PATENT DOCUMENTS

| 5,200,912 | A | 4/1993 | Asghar | |
| 5,666,537 | A * | 9/1997 | Debnath et al. | 713/322 |
| 6,035,315 | A * | 3/2000 | Krick | 708/490 |
| 6,609,209 | B1 * | 8/2003 | Tiwari et al. | 713/322 |
| 6,611,857 | B1 * | 8/2003 | Lemonds et al. | 708/629 |
| 6,922,714 | B2 * | 7/2005 | Luick | 708/503 |
| 7,058,830 | B2 * | 6/2006 | Dhong et al. | 713/320 |
| 7,137,021 | B2 * | 11/2006 | Dhong et al. | 713/324 |
| 7,725,519 | B2 * | 5/2010 | Dockser | 708/497 |
| 7,917,566 | B2 | 3/2011 | Tanabi | |
| 2003/0065699 | A1 * | 4/2003 | Burns | 708/625 |
| 2004/0143613 | A1 | 7/2004 | Clemen | |
| 2005/0050372 | A1 | 3/2005 | Hagiwara | |
| 2005/0066205 | A1 | 3/2005 | Holmer | |
| 2006/0212505 | A1 * | 9/2006 | Islam | 708/620 |

(Continued)

FOREIGN PATENT DOCUMENTS

EP    0583120 A1    2/1994
JP    2069822       3/1990

(Continued)

OTHER PUBLICATIONS

Oh et al., "A Fully Pipelined Single-Precision Floating-Point Unit in the Synergistic Processor Element of a Cell Processor," IEEE J. Solid-State Circuits, vol. 41, No. 4, pp. 759-771, 2006.*
M. J. Schulte, J. E. Stine, and J. G. Jansen, "Reduced power dissipation through truncated multiplication", Proc. IEEE Alessandro Volta Memorial Workshop Low-Power Design, pp. 61-69, 1999.*

(Continued)

*Primary Examiner* — Chat Do
*Assistant Examiner* — Matthew Sandifer
(74) *Attorney, Agent, or Firm* — Mnemoglyphics, LLC; Lawrence M. Mennemeier

(57) ABSTRACT

Methods and apparatus relating to reducing power consumption in multi-precision floating point multipliers are described. In an embodiment, certain portions of a multiplier are disabled in response to two or more multiplication operations with the same data size and data type occurring back-to-back. Other embodiments are also claimed and described.

18 Claims, 6 Drawing Sheets

(56) References Cited

U.S. PATENT DOCUMENTS

| | | | |
|---|---|---|---|
| 2007/0203967 A1* | 8/2007 | Dockser | 708/495 |
| 2007/0282938 A1* | 12/2007 | Abdallah et al. | 708/550 |
| 2008/0225939 A1* | 9/2008 | Guo et al. | 375/240.01 |
| 2008/0301458 A1* | 12/2008 | Ebeid | 713/180 |
| 2009/0198758 A1* | 8/2009 | Barowski et al. | 708/626 |
| 2009/0228729 A1* | 9/2009 | Lin | 713/322 |
| 2010/0011047 A1* | 1/2010 | Jackson et al. | 708/491 |

FOREIGN PATENT DOCUMENTS

| | | |
|---|---|---|
| JP | 06175823 | 6/1994 |
| JP | 2005078518 A | 3/2005 |
| JP | 2008102715 A | 1/2008 |
| KR | 20060066081 | 6/2006 |
| SU | 1280624 | 12/1986 |
| WO | 02057893 | 7/2002 |

OTHER PUBLICATIONS

M. Själander et al., "A low-leakage twin-precision multiplier using reconfigurable power gating," in Proc. IEEE Int. Symp. Circuits Syst. (ISCAS), pp. 1654-1657, May 2005.*

Thapliyal et al., "A Double Precision Floating Point Multiplier Suitably Designed for FPGAs and ASICs," in Proceedings CDES 2006, pp. 36-38, 2006.*

K.E. Wires, M.I. Schulte. and I.E. Stine; "Combined IEEE compliant and truncated floating point multipliers for reduced power dissipation," In Proceedings of the IEEE International Conference on Computer Design 2001, pp. 497-500, 2001.*

Knagge, "Booth Recoding," Jul. 2010, retrieved from http://www.geoffknagge.com/fyp/booth.shtml.*

O.A. Pfänder, R. Nopper, H.-J. Pfleiderer, S. Zhou, and A. Bermak, "Configurable blocks for multi-precision multiplication," in IEEE Delta 2008, pp. 478-481, Jan. 2008.*

* cited by examiner

FIG. 4

REDUCING POWER CONSUMPTION IN MULTI-PRECISION FLOATING POINT MULTIPLIERS

FIELD

The present disclosure generally relates to the field of electronics. More particularly, an embodiment of the invention relates to reducing power consumption in multi-precision floating point multipliers.

BACKGROUND

Some processors may perform floating point (FP) operations. However, performance of FP operations may increase power consumption in a processor. The additional power consumption may limit usage of a processor (or the computing device that includes the processor), e.g., due to a shortened battery life, thermal management issues, etc.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 4 illustrates a block diagram of a tree that may be utilized in some embodiments.

DETAILED DESCRIPTION

Figure 1:
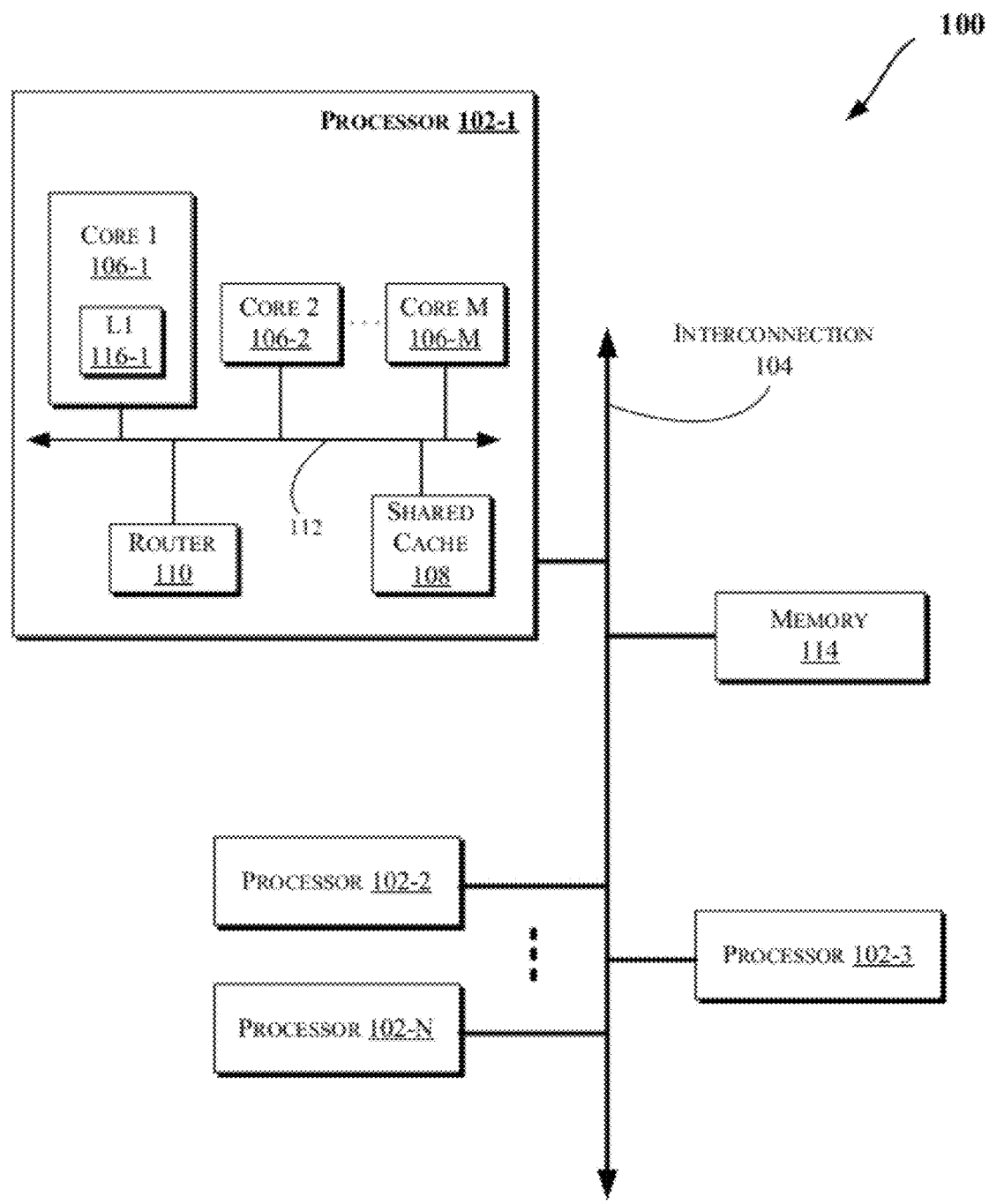
FIGS. 1, 5, and 6 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" or "micro-operation" (which may also be referred to as "uop") herein may be interchangeable.

Some embodiments discussed herein may reduce power consumption in multi-precision Floating Point (FP) Multiplier (FMUL) logic. The multi-precision FMUL may be shared for floating-point operations with different precision (such as single precision, double precision, extended precision, etc.). In an embodiment, FP (Floating Point) hardware may be clock gated (e.g., where the clock signal to at least a portion of the FP hardware may be shut off) in a way that power is used only for one precision level (such as single precision, double precision, extended precision, etc.). For example, each back-to-back single precision FP multiplication operations may result in the same or similar amount of power being dissipated/consumed as would be for one single precision operation (e.g., even though the back-to-back operations are performed in a multiplier that is also capable of performing double or extended precision multiplications). As a result, single precision multiplications will not consume the same amount of power that would be consumed by, for example, double or extended multiplications.

As discussed herein, "back-to-back" operations refer to two or more operations that occur with no other operation (of the same type) being performed by the same logic between the two or more operations. For example, back-to-back single precision FP multiplication operations may be performed by a multiplier with no other multiplication operation being performed (by the same multiplier logic) between the back-to-back single precision FP multiplication operations.

In some embodiments, clock gating may be utilized for a current operation based on data size (e.g., precision level) and/or type (e.g., floating point multiplication, integer multiplication, etc.) of a previous operation, e.g., in conjunction with the data size and type of a current operation. In an embodiment, the multiplier areas that remain constant for single precision back-to-back operations (e.g., and would be used only for a higher precision level operation) are clock gated, so these areas do not operate and waste power. Moreover, clock gating may allow for correct logic behavior with low power operation. For example, when a single precision FMUL is performed and the previous operation is also a single precision FMUL, then the ranges of data which were driven to constants in the previous operation are held for the next operation (e.g., clocks are shut off to avoid the power of opening and closing the latches/flops that would ultimately drive the same data again). If a single precision FMUL is performed, followed by a double precision FMUL, then the clocks may toggle and may allow new data into the appropriate latches/flops to perform the correct operation(s) for double precision FMUL. Accordingly, in some embodiments, logic associated with a higher precision level operation may be shut off for back-to-back operations that have a relatively lower precision level when compared with the higher precision level operation.

Such techniques may allow for improved performance in various processors, such as those discussed herein, e.g., with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116").

Figure 2:
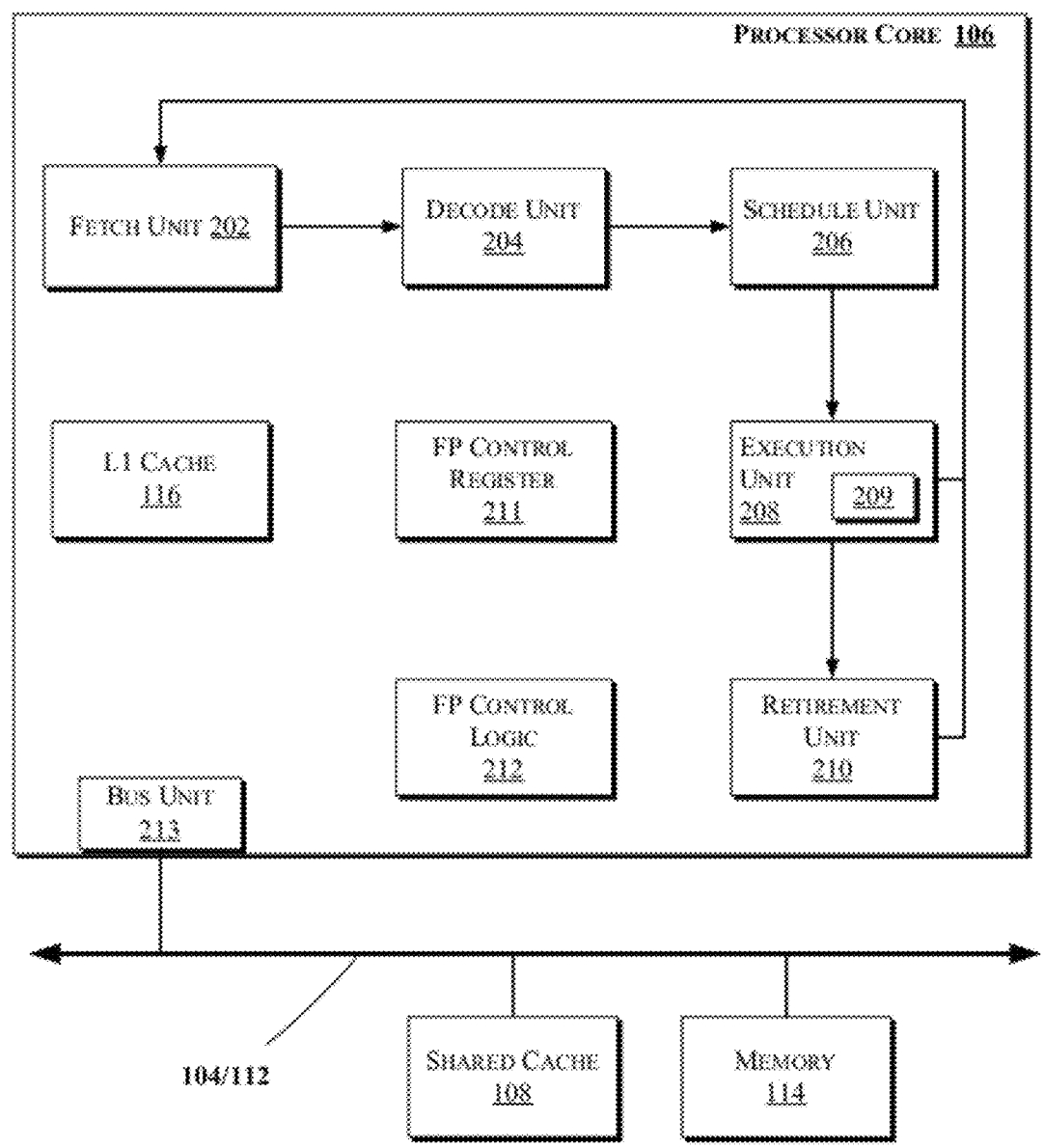
FIG. 2 illustrates a block diagram of portions of a processor core and other components of a computing system, according to an embodiment of the invention.

FIG. 2 illustrates a block diagram of portions of a processor core 106 and other components of a computing system, according to an embodiment of the invention. In one embodiment, the arrows shown in FIG. 2 illustrate the flow direction of instructions and/or data through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 5 and 6. The core 106 may optionally include a decode unit 204 to decode the fetched instruction. In an embodiment, the decode unit 204 may decode the fetched instruction into a plurality of uops (micro-operations). Some embodiments of the processor core 106 may not include decode unit 204. Hence, the core 106 may process instructions without decoding them. Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as one or more memory execution units, one or more integer execution units, one or more floating-point execution units 209 (which may include one or more multi-precision floating point multipliers), or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions (e.g., in order) after they are committed. In an embodiment, retirement of the executed instructions may result in processor state being committed from the execution of the instructions, physical registers used by the instructions being de-allocated, etc.

The core 106 may additionally include a storage unit or device such as a floating point (FP) control register 211 which may store one or more settings relating to floating point operations that are performed by the floating point unit 209. For example, these settings may indicate which portions of the floating point unit 209 are to be powered down (or clock gated, e.g., by shutting down or disabling the clock signal for at least a portion of the multiplication hardware) for back-to-back lower precision operations as discussed herein. Also, in some embodiments, the FP control register 211 may be provided in other locations than those shown in FIG. 2 (e.g., within any other memory or storage device discussed herein, etc.). An FP control logic 212 may also be included in the core 106 to cause disabling of at least a portion of the floating point unit 209, e.g., based on the stored settings in the control register 211, as will be further discussed herein.

Additionally, the core 106 may include a bus unit 213 to allow communication between components of the processor core 106 and other components (such as the components discussed with reference to FIG. 1) via one or more buses (e.g., buses 104 and/or 112).

Figure 3:
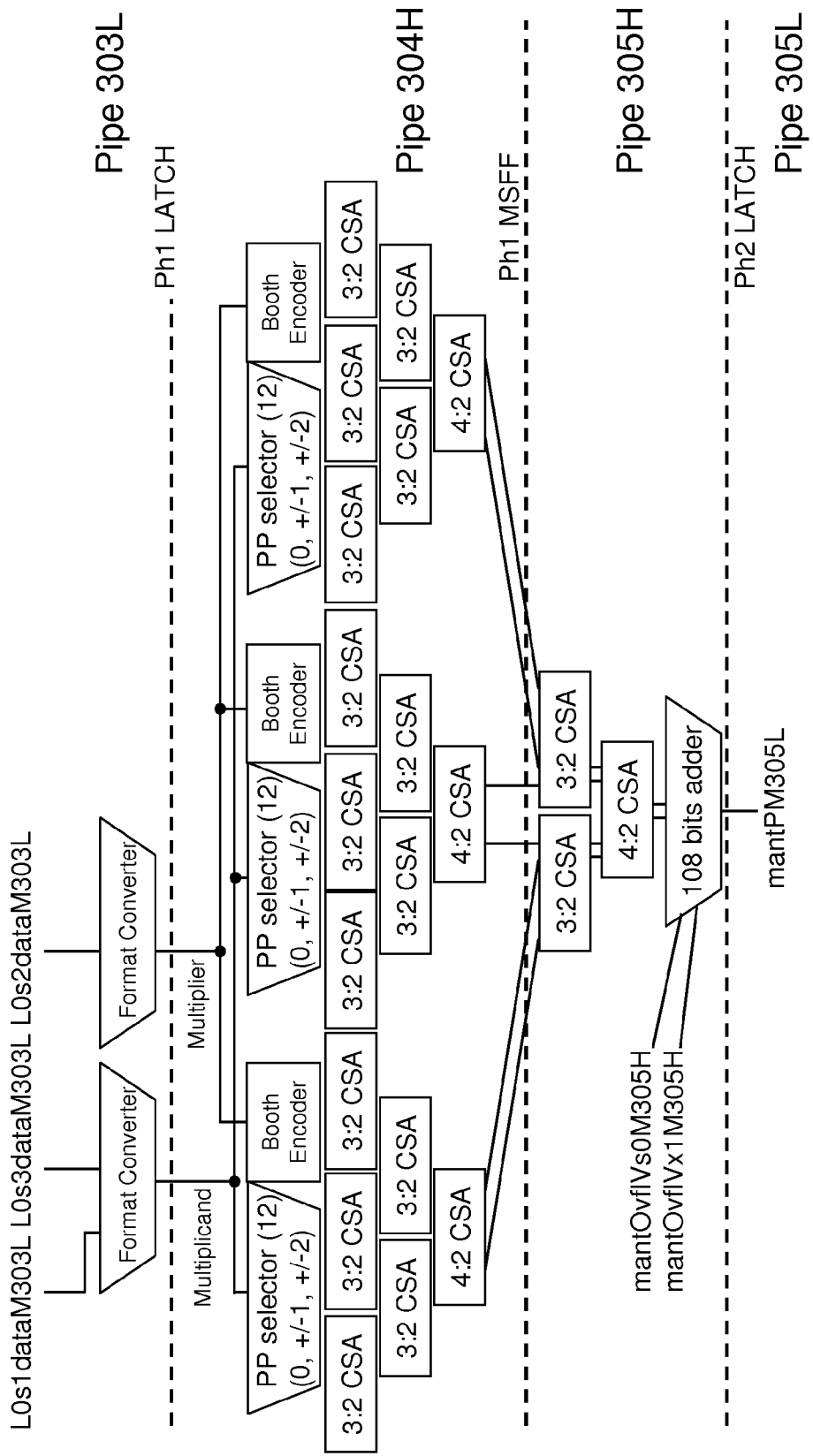
FIG. 3 illustrates a block diagram of portions of a multiplier in accordance with an embodiment of the invention.

FIG. 3 illustrates a block diagram of portions of a multiplier in accordance with an embodiment of the invention. FIG. 3 in part shows various pipeline portions (e.g., 303L, 304H, 305H, and 305L). In an embodiment, the FP execution unit 209 of FIG. 2 may include the multiplier shown in FIG. 3.

Figure 4:
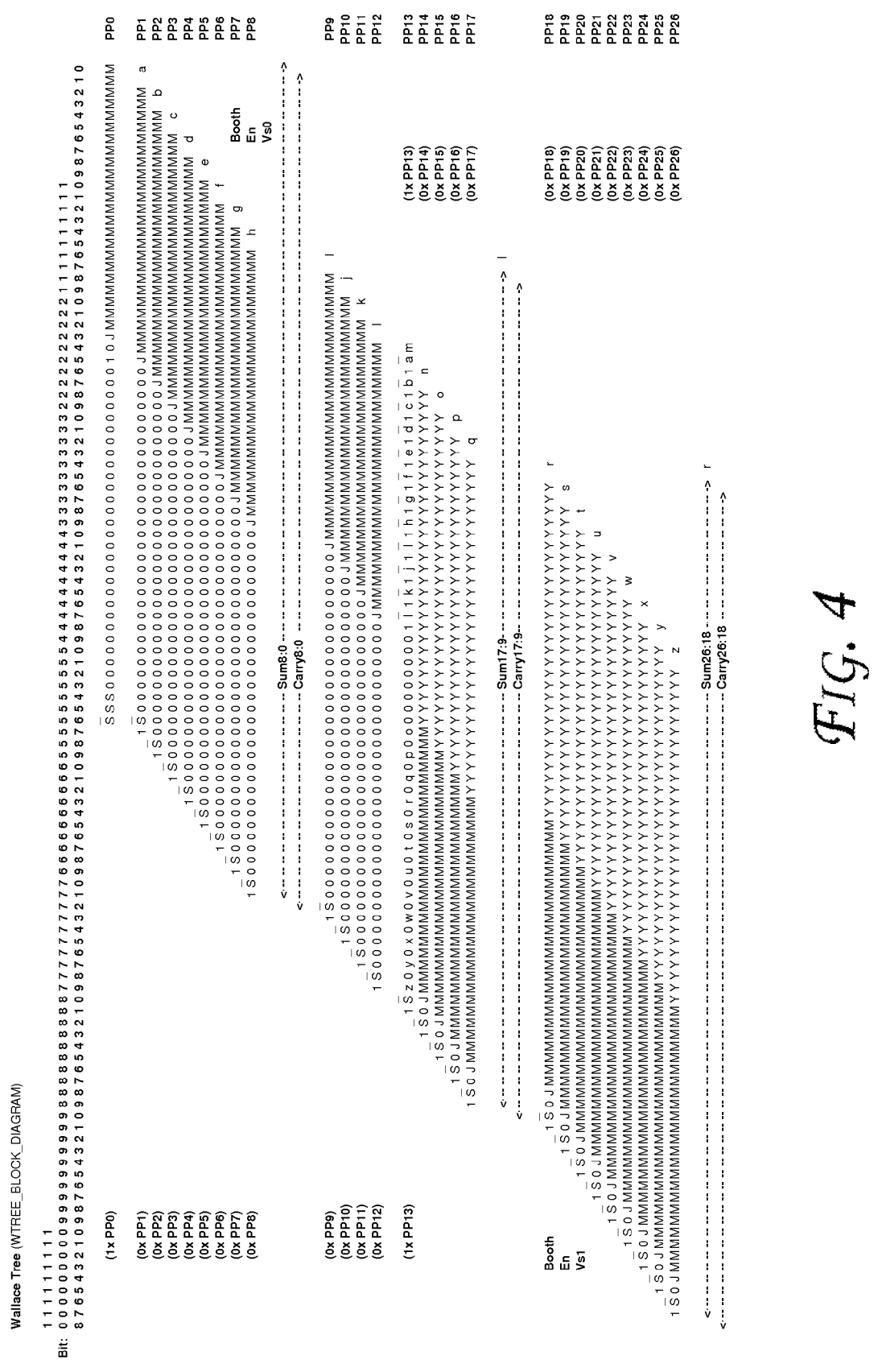

In an embodiment, FIG. 3 illustrates a block diagram of an FMA (Floating point-Multiply-Accumulate) logic. As shown, the FMA multiplier is a radix-4 Booth Encoded Wallace tree in Sum and Carry format. There are 27 partial products arranged to perform a double precision multiplication. The Wallace tree (see, e.g., FIG. 4) is organized in such a way that two single precision multiplications may be done in the shared double precision hardware:

FIG. 4 illustrates a block diagram of a Wallace tree that may be utilized in some embodiments. FIG. 4 illustrates an example of various ranges of data in a shared FMA multiplier. The areas with "0" and "Y" are held constant during back-to-back single precision multiplies to save power. Carry-in logic for negative partial products ("negate" bits labeled a-z) are input at the right most position of the Wallace tree for double precision multiplies. However, to save power, these "negate" bits are input directly into partial product (PP) 13 (not normally used for single precision multiply data), to avoid toggling the "Y" region in some embodiments. Sign generation may also be performed by using partial product 13 to allow the "0" region to stay constant in an embodiment. By using partial product 13 as shown, the entire "0" and "Y" regions may be held constant for back-to-back single precision operations.

Figure 5:
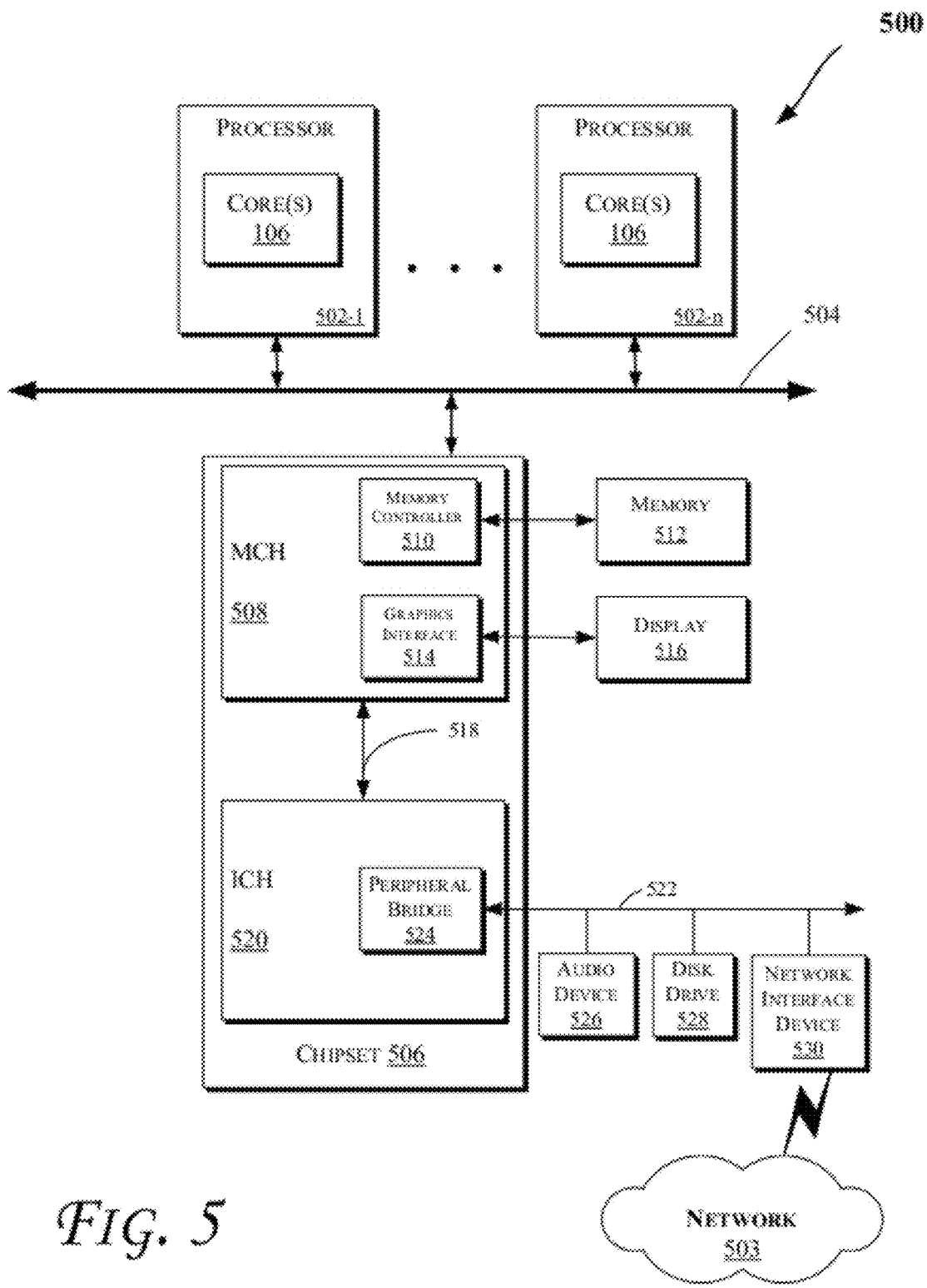

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include one or more of the cores 106. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, which may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and other components shown in FIG. 5 (including but not limited to the MCH 508, one or more components of the MCH 508, etc.) may be combined to form a single chip. Furthermore, a graphics accelerator may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
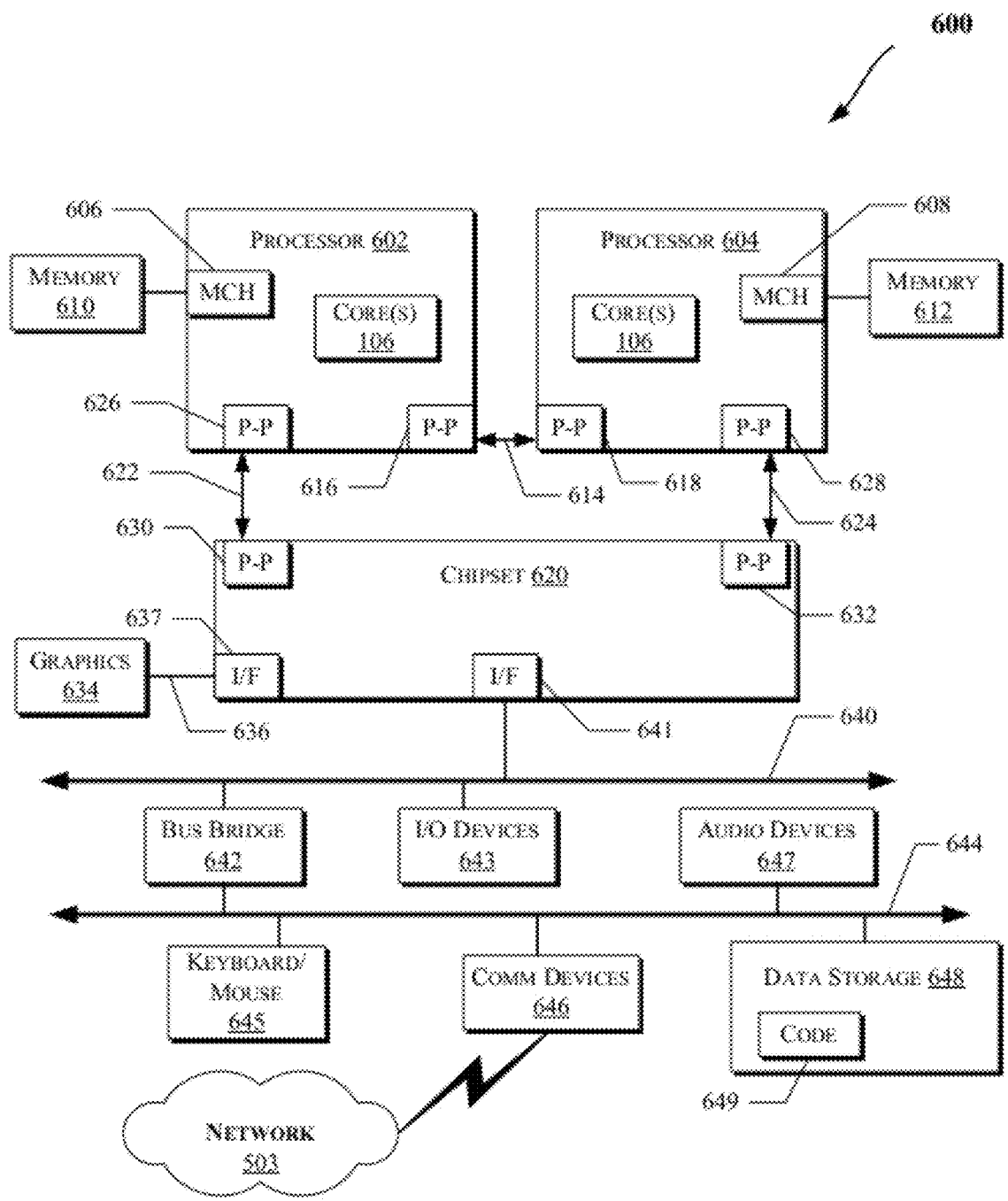

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, one or more of the cores 106 of FIGS. 1-5 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a (e.g., non-transitory) machine-readable or computer-readable medium having stored thereon instructions (or software procedures) used to program a computer to perform a process discussed herein. The machine-readable medium may include a storage device such as those discussed herein.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
  a first logic circuit to execute a first multiplication operation and a second multiplication operation, wherein the first multiplication operation and the second multiplication operation are to correspond to a same data size and data type; and
  a second logic circuit to cause further disabling of at least a portion of the first logic circuit enabled to execute the first multiplication operation to execute said second multiplication operation, in response to the second multiplication operation following the first multiplication operation with no other multiplication operation being performed by said first logic circuit between the first and the second multiplication operations, wherein the first multiplication operation and the second multiplication operation are to operate on the data size having a first precision level and wherein sign generation is to be performed based on a partial product not required in partial product generation for the first precision level but is required for a second precision level having a higher precision level than the first precision level.

2. The processor of claim 1, wherein the data type is to comprise one or more of a floating point data or an integer data.

3. The processor of claim 1, wherein the data size is to correspond to one of a single precision, a double precision, or an extended precision data.

4. The processor of claim 1, further comprising a storage unit to store one or more settings corresponding to multiplication operations that are to be performed by the first logic circuit, wherein the one or more settings are to indicate which portions of the first logic circuit are to be disabled.

5. The processor of claim 1, wherein the first multiplication operation and the second multiplication operation are to operate on the data size having a first precision level and wherein, to disable at least the portion of the first logic circuit, negative partial products are input into a partial product level which is used for a second precision level having a higher precision level than the first precision level.

6. The processor of claim 1, further comprising a third logic circuit to fetch one or more instructions, corresponding to the first multiplication operation or the second multiplication operation, from a memory.

7. The processor of claim 1, further comprising a plurality of processor cores, wherein at least one of the plurality of processor cores is to comprise the first logic circuit or the second logic circuit.

8. The processor of claim 1, wherein one or more of the first logic circuit, the second logic circuit, and one or more processor cores are on a same integrated circuit device.

9. A method comprising:
  performing a first multiplication operation and a second multiplication operation at a multiplication logic circuit, wherein the first multiplication operation and the second multiplication operation are to correspond to a same data size and data type; and
  disabling at least a portion of the multiplication logic circuit enabled while performing the first multiplication operation to perform said second multiplication operation, in response to the second multiplication operation following the first multiplication operation with no other multiplication operation being performed by multiplication logic circuit between the first and the second multiplication operations, wherein the first multiplication operation and the second multiplication operation are to operate on the data size having a first precision level and wherein, to disable at least the portion of the multiplication logic circuit, negative partial products are input into a partial product level which is used for a second precision level having a higher precision level than the first precision level.

10. The method of claim 9, wherein the data type is to comprise one or more of a floating point data or an integer data.

11. The method of claim 9, wherein the data size is to correspond to one of a single precision, a double precision, or an extended precision data.

12. The method of claim 9, further comprising storing one or more settings corresponding to multiplication operations that are to be performed by the multiplication logic circuit, wherein the one or more settings are to indicate which portions of the multiplication logic circuit are to be disabled.

13. The method of claim 9, wherein the first multiplication operation and the second multiplication operation are to operate on the data size having a first precision level and wherein sign generation is to be performed based on a partial product not required in partial product generation for the first precision level but is required for a second precision level having a higher precision level than the first precision level.

14. A system comprising:
  a memory to store a micro-operation; and
  a processor core coupled to the memory to execute the micro-operation, the processor to comprise:
    a first logic circuit to execute a first multiplication operation and a second multiplication operation, wherein the first multiplication operation and the second multiplication operation are to correspond to a same data size and data type; and
    a second logic circuit to cause disabling of at least a portion of the first logic circuit enabled while executing the first multiplication operation to execute said second multiplication operation, in response to the second multiplication operation following the first multiplication operation with no other multiplication operation being performed by said first logic circuit between the first and the second multiplication operations, wherein the first multiplication operation and the second multiplication operation are to operate on the data size having a first precision level and wherein sign generation is to be performed based on a partial product not required in partial product generation for the first precision level but is required for a second precision level having a higher precision level than the first precision level.

15. The system of claim 14, wherein the data type is to comprise one or more of a floating point data or an integer data.

16. The system of claim 14, wherein the data size is to correspond to one of a single precision, a double precision, or an extended precision data.

17. The system of claim 14, further comprising an audio device coupled to the processor core.

18. The processor of claim 14, further comprising a storage unit to store one or more settings corresponding to multiplication operations that are to be performed by the first logic circuit, wherein the one or more settings are to indicate which portions of the first logic circuit are to be disabled.

* * * * *